United States Patent [19]

Wang et al.

[11] Patent Number: 4,672,103

[45] Date of Patent: Jun. 9, 1987

[54] NON-SINTERING EPOXY RESINS PREPARED FROM TRIGLYCIDYL ETHERS AND EPIHALOHYDRINS

[75] Inventors: Chun S. Wang, Lake Jackson; Robert L. Bowden, Angleton, both of Tex.

[73] Assignee: The Dow Chemical Company, Midland, Mich.

[21] Appl. No.: 829,361

[22] Filed: Feb. 14, 1986

[51] Int. Cl.$^4$ ............................................. C08G 59/06
[52] U.S. Cl. .................................. 528/98; 525/481; 525/523; 525/533; 528/88
[58] Field of Search .................... 528/98, 88, 109; 525/481, 523, 533

[56] References Cited

U.S. PATENT DOCUMENTS

| | | | |
|---|---|---|---|
| 3,477,990 | 11/1969 | Dante et al. | 260/47 |
| 3,547,881 | 12/1970 | Mueller et al. | 260/47 |
| 3,787,451 | 1/1974 | Man | 528/98 X |
| 4,390,664 | 6/1983 | Kanayama | 525/117 |
| 4,394,496 | 7/1983 | Schrader | 528/98 |
| 4,447,598 | 5/1984 | Caskey et al. | 528/489 |

FOREIGN PATENT DOCUMENTS

| | | | |
|---|---|---|---|
| 858648 | 12/1970 | Canada | 402/261 |
| 893191 | 2/1972 | Canada | 402/267 |

*Primary Examiner*—Earl Nielsen
*Attorney, Agent, or Firm*—James G. Carter

[57] ABSTRACT

Solid non-sintering epoxy resin products are prepared by reacting a trihydric phenol such as 1,1,1-tri(hydroxyphenyl)methane with an epihalohydrin such as epichlorohydrin in the presence of an alkali metal hydroxide such as sodium hydroxide. These epoxy resins are non-sintering solid resins useful in the preparation of electrical potting or molding compositions.

19 Claims, No Drawings

NON-SINTERING EPOXY RESINS PREPARED FROM TRIGLYCIDYL ETHERS AND EPIHALOHYDRINS

BACKGROUND OF THE INVENTION

The present invention pertains to non-sintering epoxy resins prepared by reacting a trihydric phenol with an epihalohydrin.

Triglycidyl ethers of trihydric phenols have been employed in the preparation of laminates. While they have good physical and mechanical properties when cured, they are semi-solid in physical form. In the preparation of semi-conductor integrated circuits, the semi-conductor industry prefers to employ epoxy resins which are non-sintering solids.

The present invention provides the electronics encapsulating industry with products which are solid and non-sintering.

SUMMARY OF THE INVENTION

The present invention pertains to solid, non-sintering epoxy resins which result from reacting (A) at least one trihydric phenol with (B) at least one epihalohydrin wherein components (A) and (B) are employed in quantities which results in a non-sintering advanced epoxy resin and which provides a ratio of equivalents of epihalohydrin per aromatic hydroxyl group of not greater than about 1.5:1.

The present invention also pertains to a process for preparing solid, non-sintering epoxy resins from trihydric phenols and epihalohydrins which process comprises reacting a trihydric phenol with an epihalohydrin optionally in the presence of a suitable solvent while intermittently or continuously adding aqueous alkali metal hydroxide to the reaction mixture and continuously removing water by azeotroping and/or codistilling with the epihalohydrin and/or a suitable solvent, subsequently removing any unreacted epihalohydrin and solvent and water washing the resultant product to remove any alkali metal halide salt therefrom and recovering the resultant solid, non-sintering epoxy resin having a Mettler softening point of at least 78° C.

The present invention further pertains to the products resulting from curing the above curable products.

DETAILED DESCRIPTION OF THE INVENTION

The solid, non-sintering epoxy resins of the present invention can be prepared by reacting a trihydric phenol with an epihalohydrin in the presence of an alkali metal hydroxide. The use of solvents is optional, but desired.

The reaction will proceed at most any temperature from about room temperature up to the decomposition temperature of the reactants, diluents and/or products; however, it is preferred to prepare the advanced resins of the present invention at temperatures of from about 40° C. to about 120° C., preferably from about 50° C. to about 100° C., most preferably from about 60° C. to about 80° C. The reaction can proceed at any pressure from reduced pressure up to the pressure limitation of the equipment.

The reaction can, if desired, be conducted in the presence of solvents or diluents. Suitable such solvents or diluents include, for example, organic solvents such as, for example, aromatic hydrocarbons, ketones, glycol ethers, aliphatic alcohols, glycols and polyglycols cyclic or acyclic ethers, mixtures thereof and the like. Particularly suitable solvents or diluents include, for example, toluene, xylene, acetone, methyl ethyl ketone, methyl isobutyl ketone, propylene glycol methyl ether, dipropylene glycol methyl ether, ethylene glycol n-butyl ether, propanol, n-butanol, polyoxyethylene glycol, dioxane, mixtures thereof and the like.

When it is desired that the solid, non-sintering epoxy resins have a low hydrolyzable halide content, it is preferred to employ a solvent which is immiscible with water but will azeotrope or codistill with water and epihalohydrin. Suitable such solvents include, for example, ketones, aromatic hydrocarbons, cyclic ethers and the like, such as, for example, methyl isobutyl ketone, toluene, xylene, dioxane, combinations thereof and the like.

The trihydric phenols and the epihalohydrins are usually employed in quantities which provide an equivalent of epihalohydrin to phenolic hydroxyl group ratio of not greater than about 1.5:1, preferably from about 1.5:1 to about 1.3:1, most preferably from about 1.5:1 to about 1.4:1.

The non-sintering, solid epoxy resins of the present invention can be represented by the following formula I.

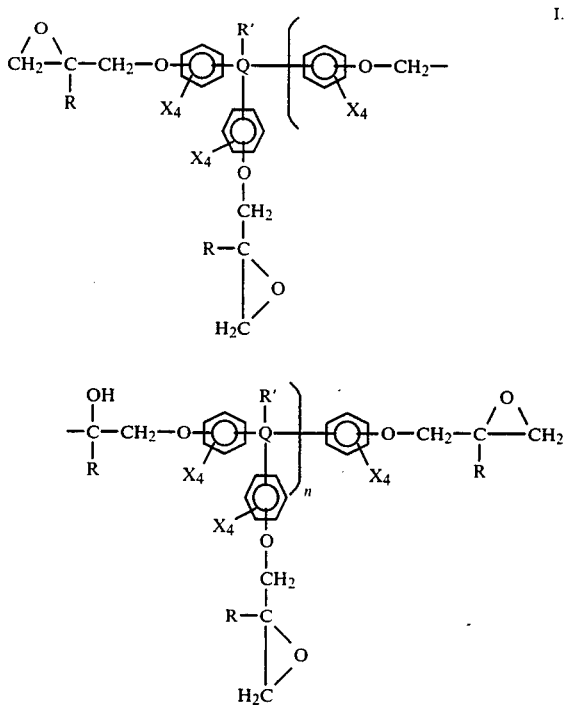

wherein Q is a trivalent aliphatic, cycloaliphatic or aromatic hydrocarbon group having from 1 to about 12, preferably from about 1 to about 6, most preferably from 1 to about 3 carbon atoms; each R is independently hydrogen or an alkyl group having from 1 to about 3 carbon atoms; each R' is independently hydrogen or a hydrocarbyl group having from 1 to about 12, preferably from 1 to about 6 carbon atoms; and each X is independently hydrogen, a monovalent hydrocarbyl group having from 1 to about 6, preferably from 1 to about 3 carbon atoms or a halogen, preferably chlorine or bromine; and n has an average value from 1 to about 3.

In order to be non-sintering, the epoxy resins should have a Mettler softening point of at least about 78° C.

Suitable trihydric phenols which can be employed herein include, for example, those represented by the following formula II:

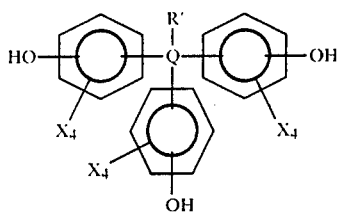

wherein Q is a trivalent hydrocarbyl group having from 1 to about 12, preferably from about 1 to about 6 carbon atoms, most preferably from 1 to about 3 carbon atoms, each R independently is hydrogen or an aliphatic monovalent hydrocarbyl group having from 1 to about 3 carbon atoms; each R' is hydrogen or a hydrocarbyl group having from 1 to about 12, preferably from about 1 to about 6 carbon atoms; and each X is independently hydrogen, a monovalent hydrocarbyl group having from 1 to about 6, preferably from 1 to about 3 carbon atoms or a halogen, preferably chlorine or bromine. Particularly suitable trihydric phenols include those prepared by reacting hydroxybenzaldehyde, vanillin, salicylaldehyde, 3-methyl-4-hydroxybenzaldehyde, 2-methyl-4-hydroxybenzaldehyde, 3,5-dimethyl-4-hydroxybenzaldehyde, mixtures thereof and the like with phenol, cresol, dimethyl phenol, mixtures thereof and the like.

Suitable epihalohydrins which can be employed herein include, for example, those represented by the formula

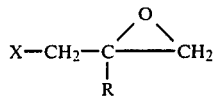

wherein R is hydrogen or an alkyl group having from 1 to about 3 carbon atoms and X is a halogen, preferably chlorine or bromine. Particularly suitable epihalohydrins include, epichlorohydrin, epibromohydrin, epiiodohydrin, methyl epichlorohydrin, mixtures thereof and the like.

Suitable alkali metal hydroxides which can be employed herein include, for example, sodium hydroxide, potassium hydroxide, lithium hydroxide, combinations thereof and the like.

The alkali metal hydroxides are preferably added as an aqueous solution in a continuous or an intermittent manner. The alkali metal hydroxides are employed in an amount which provides a ratio of caustic to phenolic hydroxyl group equivalent of from about 1.2:1 to about 0.8:1, preferably from about 1.1:1 to about 0.85:1, most preferably from about 1.0:1 to about 0.9:1.

Suitable epoxy resin curing agents which can be employed herein include, for example, aromatic and aliphatic primary amines, guanidines, biguanides, polycarboxylic acids, polycarboxylic acid anhydrides, amides, sulfones, sulfonamides, polyhydric phenols and novolacs, combinations thereof and the like. Particularly suitable curing agents include, for example, bis-(4-aminophenyl)sulfone, aminophenyl sulfonamide, dicyandiamide, phenol formaldehyde novolac, phenylenediamine, phthalic anhydride, combinations thereof and the like.

The non-sintering epoxy resins of the present invention are useful in the preparation of coatings, castings, laminates and composites, potting and molding compositions, adhesives and the like.

If desired, the curable compositions and the cured products of the present invention can contain pigments, dyes, fillers, flow control agents, leveling agents, flame retardant agents, reinforcing materials, plasticizers, extenders, mold release agents and the like in any and all combinations.

The following examples are illustrative of the invention but are not to be construed as to limiting the scope thereof in any manner.

EXAMPLE 1

To a one-liter reaction vessel equipped with temperature control and indicating means, a means for the continuous addition of aqueous sodium hydroxide and a Dean-Stark trap with a reflux condenser were added 97.3 g (1 equiv.) of 1,1,1-tri(hydroxyphenyl)methane, 138.8 g (1.5 equiv.) of epichlorohydrin and 50 g of methyl isobutyl ketone. 50 ml of methyl isobutylketone was placed into the 50 ml volume Dean-Stark trap. After stirring at room temperature and atmospheric pressure to thoroughly mix the contents, the temperature was raised to 65° C. and the pressure was reduced to 180 mm Hg absolute. To the resultant solution was continuously added 72 g (0.9 equiv.) of 50% aqueous sodium hydroxide solution at a constant rate over a period of 2 hours (7200 s). During the addition of the sodium hydroxide, the water was removed by co-distilling with epichlorohydrin and solvent. The distillate was condensed thereby forming two distinct phases, an aqueous (bottom) phase and an organic epihalohydrin-solvent (top) phase. The aqueous phase was cumulated inside the Dean-Stark trap and the organic phase overflow from the Dean-Stark trap back into the reactor. After completion of the sodium hydroxide addition, the reaction mixture was maintained at a temperature of 65° C. and a pressure of about 180 mm Hg absolute for an additional 30 minutes (1800 s). A sample was taken periodically and analyzed for phenolic hydroxyl content by UV absorption indicated that substantially all of the phenolic hydroxyl groups had reacted. The resultant resin was then distilled under a full vacuum at a temperature of 170° C. to remove all epichlorohydrin and methyl isobutyl ketone. The resultant resin contained 1,000 ppm hydrolyzable and 3,000 ppm total aliphatic chloride and a Mettler softening point of 78° C.

The molten epoxy resin was diluted to 50% resin concentration with methyl ethyl ketone/toluene (75/25) solvent mixture. The solution was stirred with 0.89 g of 45% aqueous potassium hydroxide (1.5 eq. per 1 eq. of hydrolyzable chloride) at 80° C. for two hours (7200 s). Excess potassium hydroxide was then neutralized with $CO_2$ and the mixture further diluted to 20% resin concentration with methyl ethyl ketone/toluene (75/25) solvent mixture and washed with deionized water 4–5 times to remove the salt.

The organic phase from the water washes was placed on a rotary evaporator under a full vacuum and temperature of 170° C. to remove the solvent completely. The resultant yellow, non-sintering, solid had a Mettler softening point of 80° C., a hydrolyzable chloride content of 13 ppm, a total aliphatic chloride content of 1500 ppm and an epoxide content of 21.1%.

EXAMPLE 2

The procedure of Example 1 was followed except that different solvents were employed to azeotrope with the epichlorohydrin and/or different epihalohydrin to phenolic hydroxyl ratios were employed. The results are given in the following table.

TABLE

| Run No. | EPI to Phenolic Hydroxyl Ratio | Solvent[1] in Azeotrope | Azeotroped With Water | Mettler Melting Point | Total Aliphatic Cl, ppm | Hydrolyzable Chloride ppm | Description of Product |
|---|---|---|---|---|---|---|---|
| 1 | 1.4/1 | MIBK | Yes | 93.8 | 1536 | 15 | non-sintering solid |
| 2 | 1.5/1 | MIBK | Yes | 80.3 | 1500 | 13 | non-sintering solid |
| 3* | 1.6/1 | MIBK | Yes | 75.7 | 1496 | 12 | sintering solid |
| 4* | 1.8/1 | MIBK | Yes | 66.2 | 1509 | 14 | sintering solid |
| 5 | 1.5/1 | Toluene | Yes | 80.4 | 1720 | 24 | non-sintering solid |
| 6 | 1.5/1 | PGME | No | 80.1 | 2200 | 150 | non-sintering solid |
| 7 | 1.5/1 | None | No | 80.5 | 3000 | 225 | non-sintering solid |

*Not an example of the present invention
[1]MIBK is methyl isobutyl ketone
PGME is propylene glycol methyl ether

We claim:

1. A solid, non-sintering epoxy resin represented by the following formula

I.

[structural formula showing epoxy resin with groups $CH_2-C(O)-CH_2-O-$, R', Q, $X_4$, OH, $CH_2$, R-C, $H_2C$, etc., with subscript $n$]

wherein Q is a trivalent aliphatic, cycoaliphatic or aromatic hydrocarbon group having from 1 to about 12 carbon atoms; each R is independently hydrogen or an alkyl group having from 1 to about 3 carbon atoms; each R' is independently hydrogen or a hydrocarbyl group having from 1 to about 12 carbon atoms; and each X is independently hydrogen, a monovalent hydrocarbyl group having from 1 to about 6 carbon atoms or a halogen; and n has an average value from 1 to about 3.

2. A solid, non-sintering epoxy resin which results from reacting in the presence or absence of a solvent at least one trihydric phenol and at least one epihalohydrin in the presence of an alkali metal hydroxide wherein the components are employed in amounts which provide a ratio of the equivalents of epihalohydrin to equivalents of phenolic hydroxide of not greater than about 1.5:1 and a ratio of equivalents of alkali metal hydroxide to phenolic hydroxyl is from about 0.8:1 to about 1.2:1.

3. A solid, non-sintering epoxy resin of claim 2 wherein the components are employed in amounts which provide a ratio of the equivalents of epihalohydrin to equivalents of phenolic hydroxyl of from about 1.3:1 to about 1.5:1 and a ratio of equivalents of alkali metal hydroxide to phenolic hydroxyl is from about 0.85:1 to about 1.1:1.

4. A solid, non-sintering epoxy resin of claim 3 wherein the components are employed in amounts which provide a ratio of the equivalents of epihalohydrin to equivalents of phenolic hydroxyl of from about 1.4:1 to about 1.5:1 and a ratio of equivalents of alkali metal hydroxide to phenolic hydroxyl is from about 0.9:1 to about 1.0:1.

5. A solid, non-sintering epoxy resin of claim 4 wherein said epihalohydrin is epichlorohydrin, said trihydric phenol is 1,1,1-tri(hydroxyphenyl)methane and said alkali metal hydroxide is sodium hydroxide.

6. A process for preparing solid, non-sintering epoxy resins from trihydric phenols and epihalohydrins which process comprises reacting at least one trihydric phenol with at least one epihalohydrin optionally in the presence of at least one suitable solvent while intermittently or continuously adding aqueous alkali metal hydroxide to the reaction mixture and continuously removing water by azeotroping and/or codistilling with the epihalohydrin and/or a suitable solvent, subsequently removing any unreacted epihalohydrin and solvent and water washing the resultant product to remove any alkali metal halide salt therefrom and recovering the resultant solid, non-sintering epoxy resin having a Mettler softening point of at least 78° C. and wherein the components are employed in amounts which provide a ratio of the equivalents of epihalohydrin to equivalents of phenolic hydroxide of not greater than 1.5:1 and a ratio of equivalents of alkali metal hydroxide to phenolic hydroxyl is from about 0.9:1 to about 1.1:1 and the reaction is conducted at a temperature of from about 55° C. to about 80° C.

7. A process of claim 6 wherein the components are employed in amounts which provide a ratio of the equivalents of epihalohydrin to equivalents of phenolic hydroxide of from about 1.4:1 to about 1.5:1 and a ratio of equivalents of alkali metal hydroxide to phenolic hydroxyl is from about 0.9:1 to about 1.0:1.

8. A process of claim 7 wherein the components are employed in amounts which provide a ratio of the equivalents of epihalohydrin to equivalents of phenolic hydroxide of from about 1.4:1 to about 1.5:1 and a ratio of equivalents of alkali metal hydroxide to phenolic hydroxyl is from about 0.9:1 to about 1.0:1.

9. A process of claim 8 wherein said epihalohydrin is epichlorohydrin, said trihydric phenol is 1,1,1-tri(hydroxyphenyl)methane and said alkali metal hydroxide is sodium hydroxide and the reaction is conducted in the presence of methyl isobutyl ketone or toluene.

10. A curable composition which comprises (1) an epoxy resin of claim 1 and a curing quantity of a suitable curing agent for the epoxy resin.

11. A curable composition which comprises (1) an epoxy resin of claim 2 and a curing quantity of a suitable curing agent for the epoxy resin.

12. A curable composition which comprises (1) an epoxy resin of claim 3 and a curing quantity of a suitable curing agent for the epoxy resin.

13. A curable composition which comprises (1) an epoxy resin of claim 4 and a curing quantity of a suitable curing agent for the epoxy resin.

14. A curable composition which comprises (1) an epoxy resin of claim 5 and a curing quantity of a suitable curing agent for the epoxy resin.

15. The composition resulting from subjecting the curable composition of claim 10 to conditions sufficient to effect a cure.

16. The composition resulting from subjecting the curable composition of claim 11 to conditions sufficient to effect a cure.

17. The composition resulting from subjecting the curable composition of claim 12 to conditions sufficient to effect a cure.

18. The composition resulting from subjecting the curable composition of claim 13 to conditions sufficient to effect a cure.

19. The composition resulting from subjecting the curable composition of claim 14 to conditions sufficient to effect a cure.

* * * * *